Dec. 28, 1926.  
J. JACOBS  
BELT  
Filed Sept. 24, 1925

1,612,024

Inventor  
Joe Jacobs.  
By  
Attorney

Patented Dec. 28, 1926.

1,612,024

UNITED STATES PATENT OFFICE.

JOE JACOBS, OF DENVER, COLORADO.

BELT.

Application filed September 24, 1925. Serial No. 58,296.

This invention relates to improvements in belts.

It is oftentimes desirable and necessary that belts shall have a limited amount of elasticity and at the same time be able to withstand the strains without becoming unduly elongated. Leather and fabric belts are substantially nonelastic and, although they may be satisfactory for many purposes, they have not the requisite elasticity to produce the best results in some cases. Rubber belts have been tried, but these are too elastic with the result that they vibrate and fail to properly transmit the power. If rubber belts are provided with a core of cotton cord or cord fabric, they immediately lose their elasticity and assume the objectionable characteristics of the ordinary rubber composition fabric belt. It is the object of this invention to produce a rubber belt that shall have cord reenforcing means extending longitudinally thereof and at the same time have the required amount of longitudinal elasticity. In order to attain this object, I construct my belts with a central reenforcing structure of cord comprising in a flat belt one or more layers of spaced cords which extend parallel and which are not continuous but are cut into several pieces. The cuts are distributed so as to be staggered with respect to each other; this permits a slight extension of the belt due to the yielding of the material that connects the cords. In round belts I provide a central core comprising a plurality of spaced parallel cords that are cut into several pieces and embedded into the rubber composition of the belt. I may also obtain similar effects in flat belts by employing two or more layers of cord fabric cut so that the cords cross on the bias whereby a longitudinal extension corresponding to the angle that the cords make with the axis of the belt is obtained.

In order more clearly to describe my invention and to explain the manner of constructing the same, I shall have reference to the accompanying drawing in which the preferred embodiment has been illustrated and in which.

Figure 1:
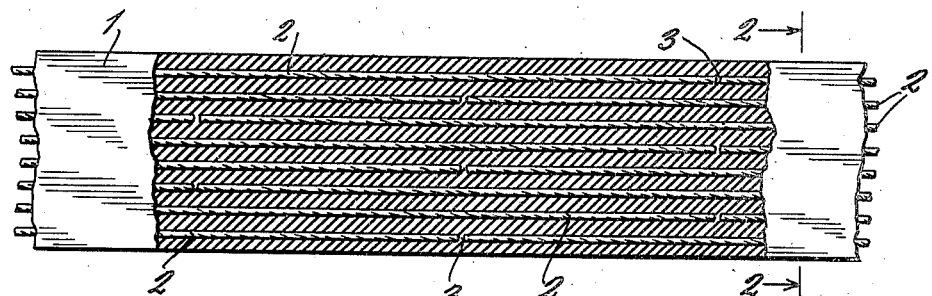
Fig. 1 is a plan view of a portion of a flat belt which has a portion thereof removed for the purpose of showing the cord reenforcement.
Figure 2:
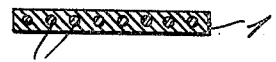
Fig. 2 is a section taken on line 2—2, Fig. 1.

In Fig. 1 I have shown a flat belt 1 in which I have embedded a number of cords 2 that form a layer. These cords are not continuous but are severed at points 3. The cuts are distributed lengthwise, or, in other words, are staggered so as to obviate the formation of a weak spot. The cords are vulcanized between two layers of rubber so as to occupy a central position in the belt. I have shown only a single layer of cords, but as many layers may be used as are found to be necessary. If more than one layer is used the several layers must be separated by a layer of rubber. The cords may first be formed into a cord fabric similar to that employed in making cord tires and strips of the required width cut from this fabric in the direction of the cords. Such fabric has a thin coating of rubber and may be vulcanized in place between two strips of rubber. In the construction shown in Fig. 3 the cord fabric may be cut into strips in which the cords run on a bias and two or more of these strips laid one on the other with the cords crossing after which they are vulcanized in place between two rubber strips whereby a homogeneous belt with a cord reenforcing center is formed.

Figure 5:
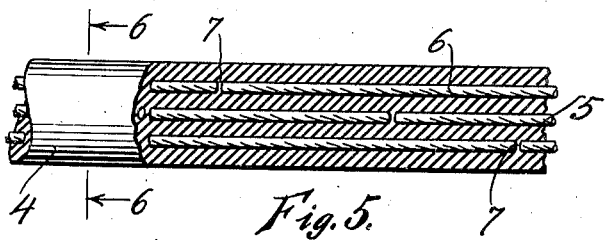
Fig. 5 is a plan view of a portion of a round belt constructed in accordance with my invention.
Figure 6:
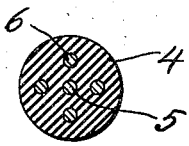
Fig. 6 is a cross section taken on line 6—6, Fig. 5.
Figure 7:
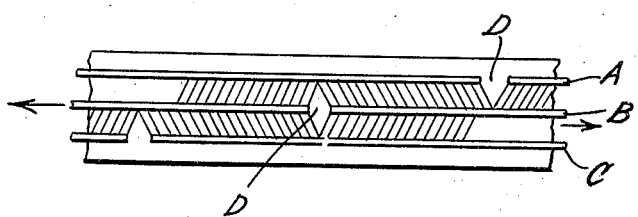
Fig. 7 is a view intended to illustrate the manner in which the elongation is effected.

In Figs. 5 and 6 I have shown a round belt 4 having five cords extending longitudinally thereof, there being shown a central cord 5 and four cords 6 spaced symmetrically about the central cord. These cords like those shown in Fig. 1 are cut at points 7. When a belt constructed like that shown in Fig. 1 or Fig. 5 is subjected to a longitudinal strain, the cords will be drawn apart at the cuts. This relative longitudinal movement between the parallel cords produces a strain in the material by which they are connected. In Fig. 7 I have shown three parallel cords A, B and C that have been severed at D. When force is applied in the direction of the arrows, the ends of the cords are pulled apart and the material between the cords is subjected to stresses in the direction of the lines joining the several cords. When the tension is removed the medium in which the cords are embedded returns to its condition of repose. If the cords have one cut only, then a certain extension can be obtained and if the cords have two cuts the extension will be twice as great, etc. It is evident that I do not depend upon the elasticity of the cords and for the purpose of this application, they may be considered to be nonextensible although, strictly speaking, that is not true. If the cords were endless loops, the extension would be so small as to be negligible but by embedding the cords in an elastic medium and severing the cords at different places and at as many places as may be desired, almost any degree of elasticity may be obtained varying between the elasticity of the cords and that of the medium in which the cords are embedded.

Figure 3:
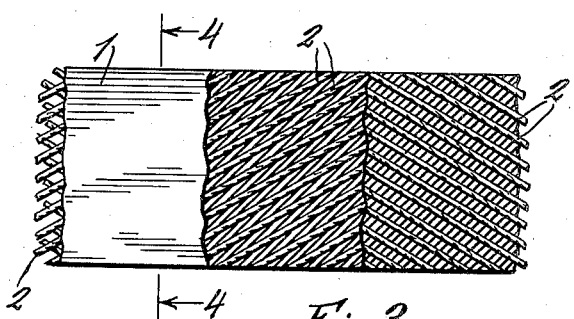
Fig. 3 is a view similar to that shown in Fig. 1 and illustrates a construction in which the belt is reenforced with a double layer of cord fabric cut so that the cords are on a bias and cross each other.
Figure 4:
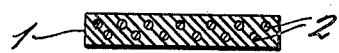
Fig. 4 is a section taken on line 4—4, Fig. 3.

In the embodiment in Fig. 3, the extension is also obtained by distorting the material between the cords and the idea underlying the construction shown in Fig. 3 is broadly the same as that shown in Figs. 1 and 7. It is evident that the number of cords or of layers is immaterial as the operation is the same in every case.

Having now described my invention, what I claim as new is:

1. An elastic belt formed from an elastic material reenforced by a plurality of separate nonelastic cord sections, each section being shorter than the belt and connected to the adjacent cord section by means of said elastic material.

2. An elastic belt formed from an elastic material having imbedded therein a plurality of sections of nonelastic cord, each section being shorter than the belt and spaced from the adjacent section whereby said cord sections will move relative to each other when the belt is subjected to tension.

3. A belt formed from an elastic material reenforced by a plurality of nonelastic cords which are embedded in the belt and cut at various points along their lengths whereby the several sections of the same cord and the several separate cords will move relative to each other when the belt is subjected to tension.

In testimony whereof I affix my signature.

JOE JACOBS